(12) United States Patent
Mishchenko et al.

(10) Patent No.: US 11,355,102 B1
(45) Date of Patent: Jun. 7, 2022

(54) WAKEWORD DETECTION

(71) Applicant: Amazon Technologies, Inc., Seattle, WA (US)

(72) Inventors: Yuriy Mishchenko, Lexington, MA (US); Thibaud Senechal, Somerville, MA (US); Anish N. Shah, Bedford, MA (US); Shiv Naga Prasad Vitaladevuni, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 16/712,539

(22) Filed: Dec. 12, 2019

(51) Int. Cl.
*G10L 15/22* (2006.01)
*G10L 15/16* (2006.01)
*G10L 15/06* (2013.01)
*G06N 3/04* (2006.01)
*G06N 3/08* (2006.01)
*G10L 15/30* (2013.01)
*G10L 15/08* (2006.01)

(52) U.S. Cl.
CPC ............ *G10L 15/16* (2013.01); *G06N 3/0454* (2013.01); *G06N 3/08* (2013.01); *G10L 15/063* (2013.01); *G10L 15/22* (2013.01); *G10L 15/30* (2013.01); *G10L 2015/088* (2013.01); *G10L 2015/223* (2013.01)

(58) Field of Classification Search
CPC ....... G10L 15/16; G10L 15/063; G10L 15/22; G10L 15/30; G10L 2015/088; G10L 2015/223; G06N 3/08; G06N 3/0454
See application file for complete search history.

(56) References Cited

U.S. PATENT DOCUMENTS

| | | | | |
|---|---|---|---|---|
| 5,546,538 | A * | 8/1996 | Cobbley | G06F 3/16 709/203 |
| 9,218,806 | B1 * | 12/2015 | Salvador | G10L 15/02 |
| 10,971,158 | B1 * | 4/2021 | Patangay | H04L 67/20 |
| 2015/0095027 | A1 * | 4/2015 | Parada San Martin | G10L 15/02 704/232 |
| 2015/0294670 | A1 * | 10/2015 | Roblek | G10L 17/00 704/232 |
| 2016/0180838 | A1 * | 6/2016 | Parada San Martin | G06N 3/02 704/232 |
| 2018/0336892 | A1 * | 11/2018 | Kim | G10L 15/08 |
| 2020/0098386 | A1 * | 3/2020 | Smith | G10L 25/03 |

* cited by examiner

*Primary Examiner* — Huyen X Vo
*Assistant Examiner* — Athar N Pasha
(74) *Attorney, Agent, or Firm* — Pierce Atwood LLP

(57) ABSTRACT

A neural network model of a user device is trained to map different words represented in audio data to different points in an N-dimensional embedding space. When the user device determines that a mapped point corresponds to a wakeword, it causes further audio processing, such as automatic speech recognition or natural-language understanding, to be performed on the audio data. The user device may first create the wakeword by first processing audio data representing the wakeword to determine the mapped point in the embedding space.

22 Claims, 14 Drawing Sheets

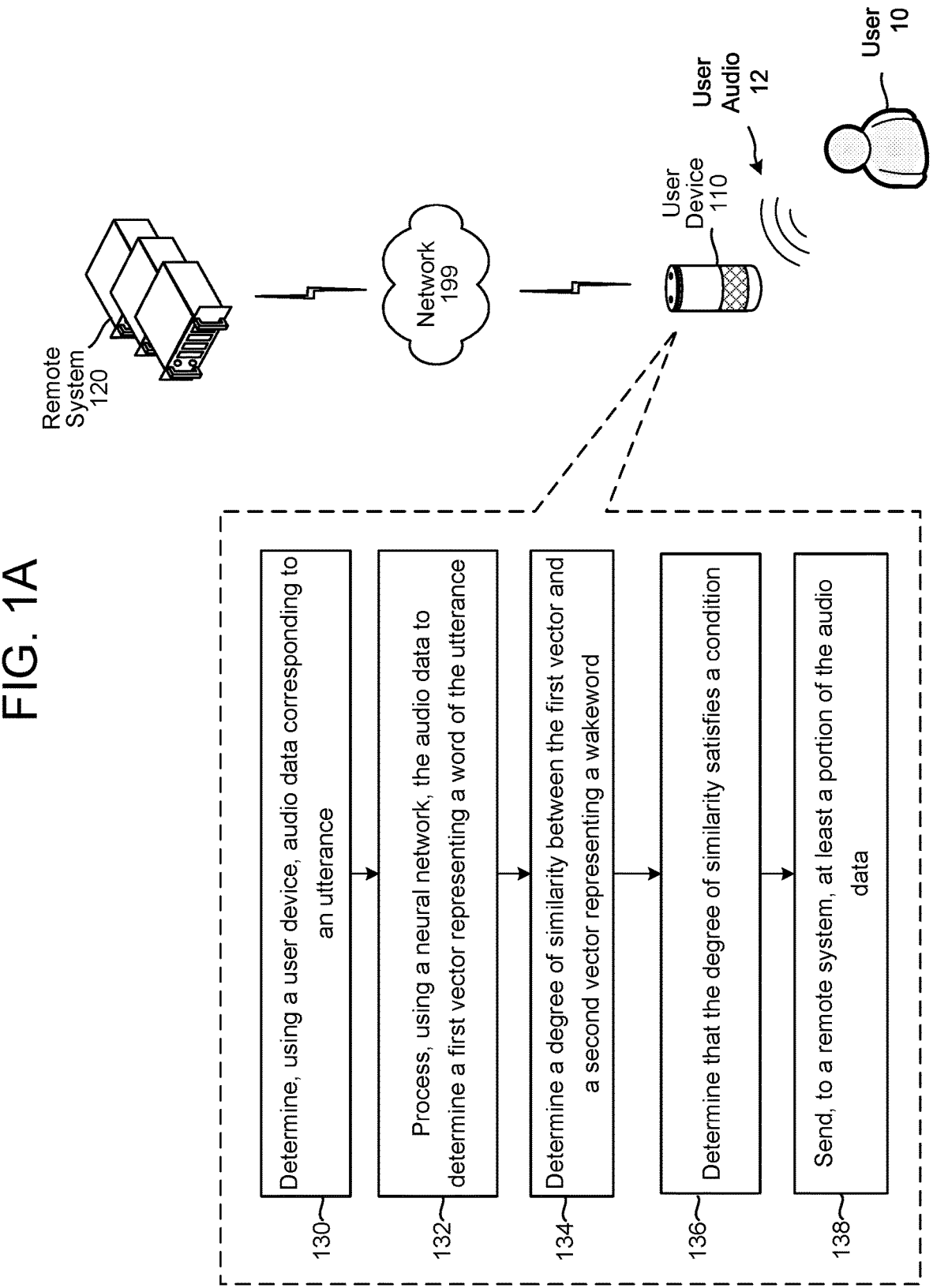

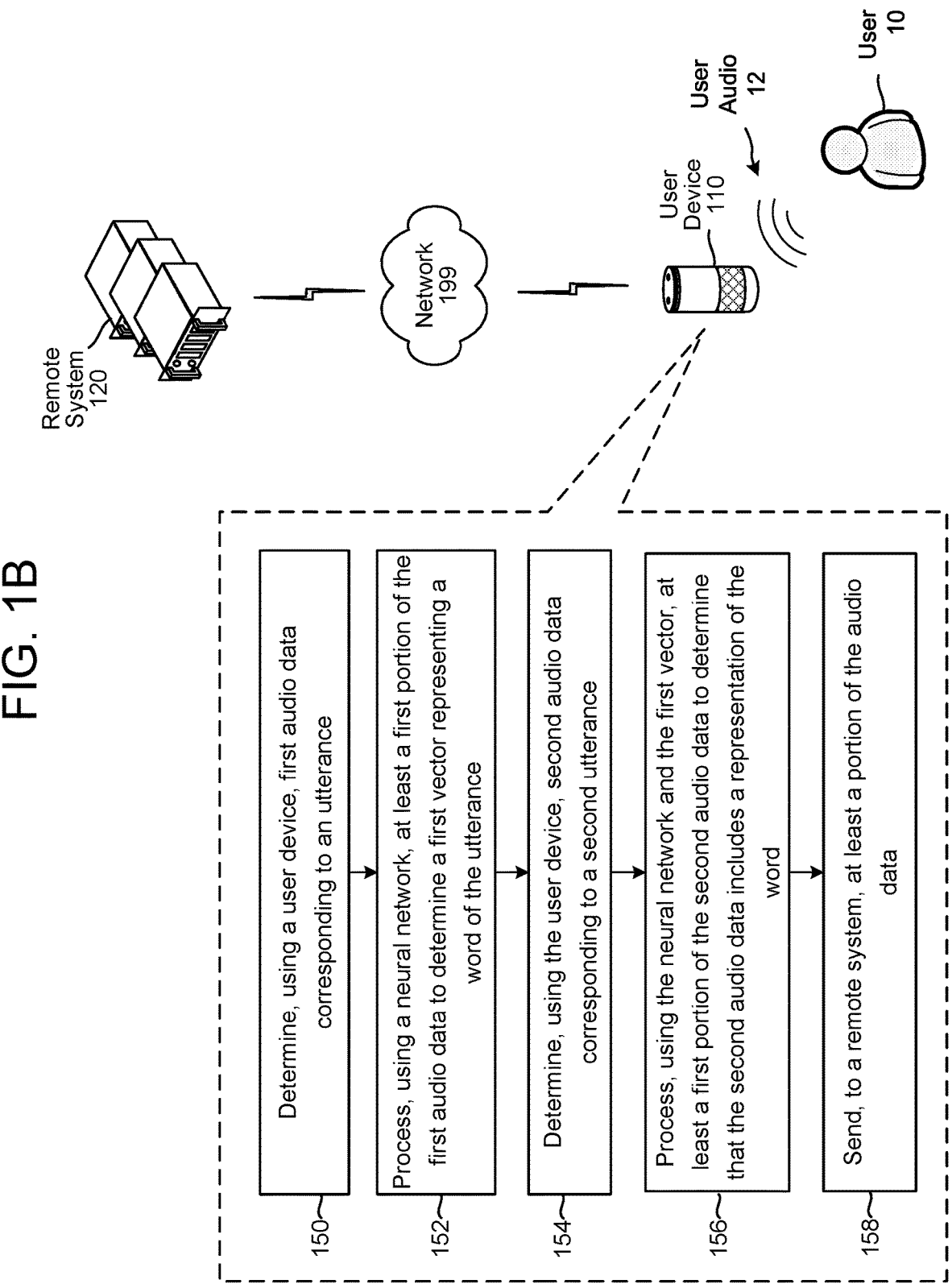

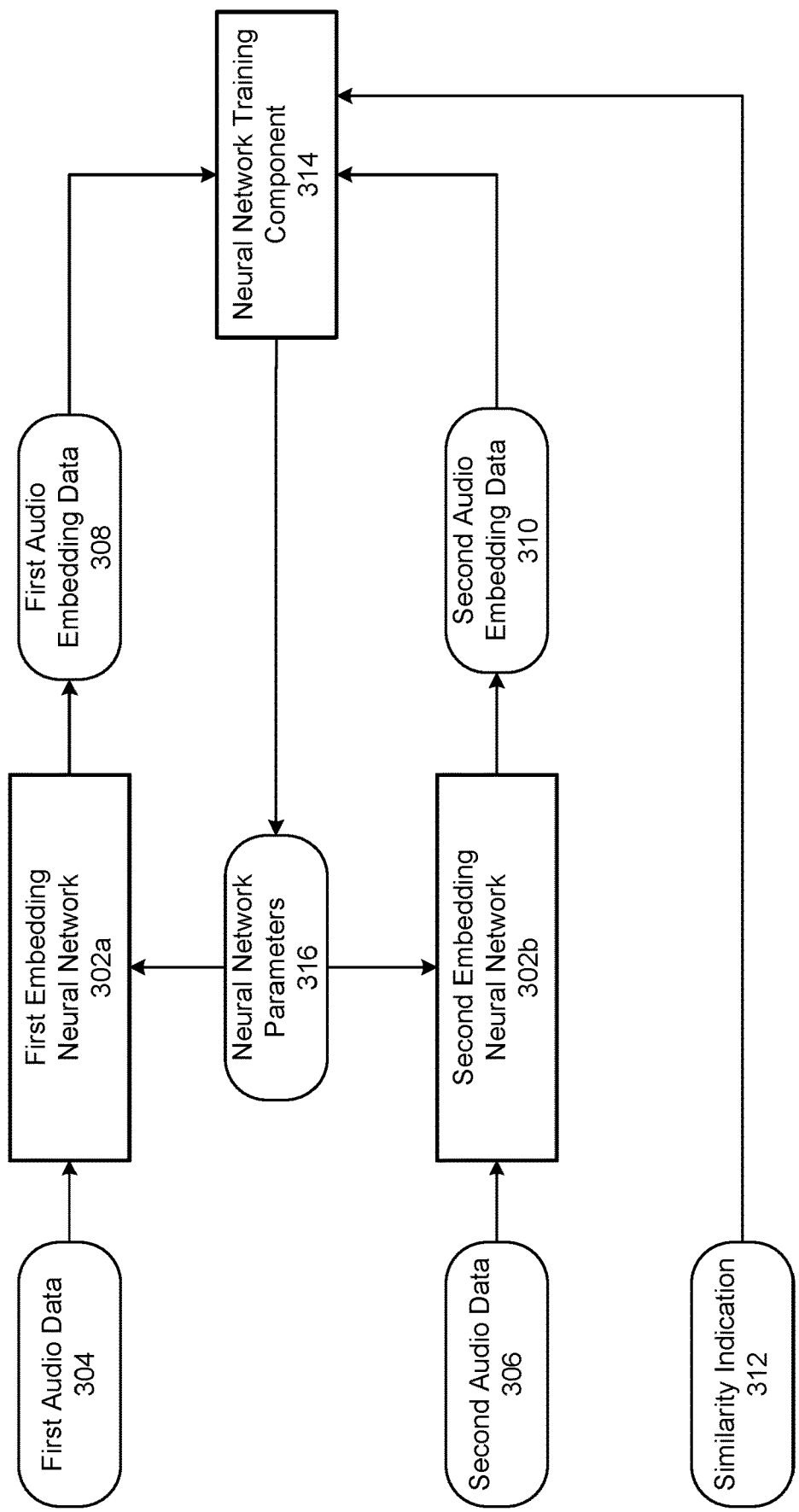

FIG. 4A

| First Audio Data 1:<br>Speaker 1<br>Word 1 | Second Audio Data 1:<br>Speaker 1<br>Word 1 | Similarity Indication 1:<br>Similar |
|---|---|---|
| First Audio Data 2:<br>Speaker 1<br>Word 1 | Second Audio Data 2:<br>Speaker 1<br>Word 2 | Similarity Indication 2:<br>Dissimilar |
| First Audio Data 3:<br>Speaker 1<br>Word 1 | Second Audio Data 3:<br>Speaker 2<br>Word 1 | Similarity Indication 3:<br>Similar |
| First Audio Data 4:<br>Speaker 1<br>Word 1 | Second Audio Data 4:<br>Speaker 2<br>Word 2 | Similarity Indication 4:<br>Dissimilar |
| ... | ... | ... |
| First Audio Data M | Second Audio Data M | Similarity Indication M |

| First Audio Data 1: Speaker 1 Word 1 | Second Audio Data 1: Speaker 1 Word 1 | Similarity Indication 1: Similar |
|---|---|---|
| First Audio Data 2: Speaker 1 Word 1 | Second Audio Data 2: Speaker 1 Word 2 | Similarity Indication 2: Dissimilar |
| First Audio Data 3: Speaker 1 Word 1 | Second Audio Data 3: Speaker 2 Word 1 | Similarity Indication 3: Dissimilar |
| First Audio Data 4: Speaker 1 Word 1 | Second Audio Data 4: Speaker 2 Word 2 | Similarity Indication 4: Dissimilar |
| ... | ... | ... |
| First Audio Data M | Second Audio Data M | Similarity Indication M |

400b

WAKEWORD DETECTION

BACKGROUND

A user device may be configured to capture audio and to convert the audio to audio data. The user device may employ speech-processing techniques to process the audio data to perform various operations, such as recognizing speech of represented in the audio data. The user device may thus be configured to determine that the audio data includes a representation of one or more determined words, such as a wakeword.

BRIEF DESCRIPTION OF DRAWINGS

For a more complete understanding of the present disclosure, reference is now made to the following description and the accompanying drawings.

FIG. 1A illustrates a system for detecting a wakeword using a neural network according to embodiments of the present disclosure.

FIG. 1B illustrates a system for creating and detecting a wakeword using a neural network according to embodiments of the present disclosure.

FIG. 3 illustrates a system for training a neural network according to embodiments of the present disclosure.

FIGS. 4A and 4B illustrate training data for training a neural network according to embodiments of the present disclosure.

DETAILED DESCRIPTION

Figure 2:
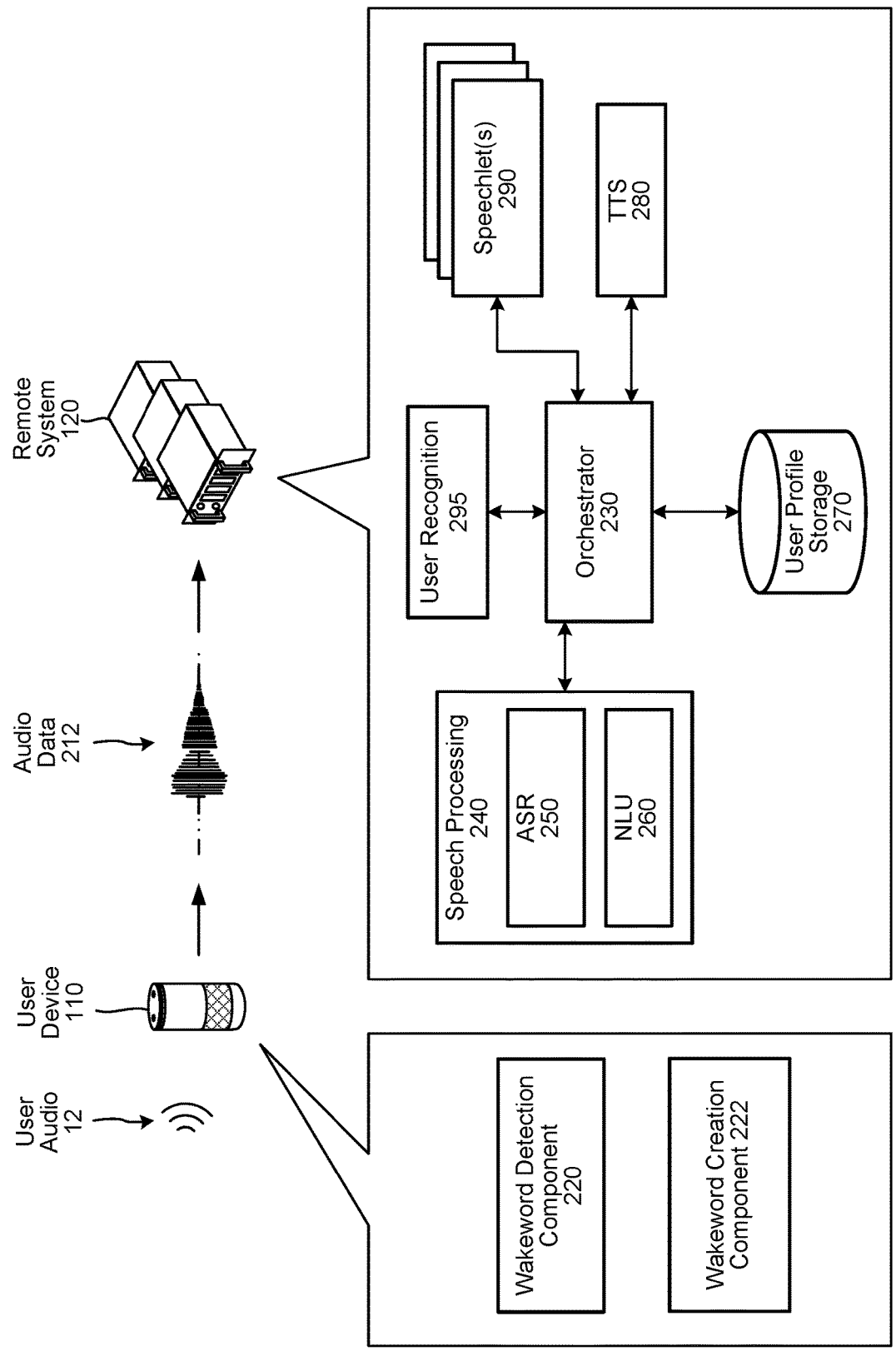
FIG. 2 illustrates a system for detecting a wakeword and performing speech processing according to embodiments of the present disclosure.

Speech-processing systems allow users to interact with computing devices using their voices. These systems may use techniques such as automatic-speech recognition (ASR) and natural-language understanding (NLU) to recognize words spoken by a user, based on the various qualities of received audio, and understand the intent of the user given the recognized words. The device may, for example, perform tasks based on the user's spoken commands based on the determined intent. Speech processing may involve converting a user's speech into text data, which may then be used to determine and act on the commands. Speech processing may be used by computers, hand-held devices, smart telephones, smart speakers, and a wide variety of other devices to improve human-computer interactions.

Continually performing ASR and NLU to recognize and understand a full set of words and sentences may, however, be computationally expensive, use a high amount of electrical power, or both. Even greater computing resources may be needed to perform ASR and NLU quickly enough to provide responses to a user query within an amount of time acceptable to the user. To address these issues, a user device may cause performance of ASR and NLU (e.g., "wake") only when it first detects that the audio data includes a representation of a particular word or words, referred to herein as a "wakeword" and/or "keyword," such as "Alexa" or "computer." The user device may process audio data received from a microphone (using, for example, a voice-activity detection component and/or wakeword-detection component, as described in greater detail below) to determine if the audio data exhibits properties associated with the wakeword, such as a particular sequence of sounds. This processing may be performed by, for example, a hidden Markov model (HMM). Thus a device may first detect a wakeword and only then perform certain further activity, for example performing speech processing or sending audio data to another device to perform speech processing.

To further address these issues, a distributed computing environment may be used when performing some or all of the speech processing. An example distributed environment may include a user device having one or more microphones configured to capture sounds of a user speaking; the user device may then convert those sounds into audio data. The user device may send the audio data to a remote system for further processing to determine a command represented in the audio data. The command may then be executed by a combination of the remote system and/or user device, depending on the command itself. The remote system may include a cloud system where the device(s) of the remote system are distributed far from the local device and/or the remote system may include a system where certain components are located more proximate to the local device, for example as part of a home server or the like located at a user's home, business, etc.

User devices of speech-processing systems thus may monitor received audio to recognize a wakeword and, only upon recognition of the wakeword, send the corresponding audio data to the remote system (and/or further process the audio data itself). The user device may thus continually process input audio data only to detect the wakeword (and not, for example, continually perform ASR and/or NLU) and may not further process any audio detected that does not include the wakeword. If, for example, the wakeword is "Alexa," the user may command the user device to play music by saying "Alexa, play some music" when near the user device. The user device, after recognizing the wakeword "Alexa," may process the subsequent audio (in this example, "play some music") to determine the command represented by the audio. The user device, may, instead or in addition, send data corresponding to that subsequent audio (as well as, in some embodiments, audio corresponding to the wakeword and/or audio received prior to the wakeword) to the remote system to determine the command. Responses to other commands may include, for example, performing actions or activities, outputting media, obtaining and/or providing information, and/or initiating Internet-based services corresponding to the command.

The user device may include a neural-network model that processes audio data to detect the wakeword. As described in greater detail herein, the neural-network model may be trained (by, e.g., the remote system or some other system) using training audio data that includes representations of the wakeword—as well as representations of other words—such that an output of the model operating at evaluation/runtime indicates when input audio data corresponds to the wakeword. This neural-network model may include, for example, an acoustic front end that determines text data given input audio data; this text data may be a sequence of representations of sub-word sounds or "phones" represented in the audio data. The neural-network model may further include a hidden Markov model (HMM) configured to recognize when a given sequence of phones matches that of a learned wakeword.

This type of neural-network model is, however, limited to detecting only a small number of predetermined wakewords. Training the neural-network model may require first obtaining sufficient training data (e.g., recordings of multiple individuals speaking the wakeword and a variety of non-wakeword words). Training the neural-network model may then require significant computing resources to process the training data using the neural-network model and configure the neural-network model to accurately indicate when the wakeword is represented in the training data. Because a user device may lack sufficient computing resources and/or sufficient training data to train the neural-network model, such model training typically happens with systems with more computing power (e.g., the remote system 120). A system may thus train a model to detect a wakeword and then distribute that model to device(s) 110 so the device 110 may, at runtime, detect the wakeword. Any updates to the model then typically happen remotely with updates pushed to local devices. Such a system may not provide sufficient flexibility if the system is to be configured to detect a new wakeword. At most, the user device may allow a user to select from available wakewords (such as "Alexa" or "computer") with corresponding models. The user device is not typically configured to allow the creation and operation of customized wakewords.

A user may, however, wish to create a new wakeword other than the predetermined wakeword or wakewords. The user may simply prefer to use a different word as the wakeword. In some instances, one or more of the predetermined wakewords may cause the user device to perform sub-optimally, such as if the user's name is the same as or similar to the wakeword (e.g., "Alexa") and/or if speech proximate the user device frequently includes use of the wakeword (e.g., "computer") but that is not intended to wake the user device. In these instances, the user device may wake in error when it detects the wakeword but when the user did not intend to wake the user device, causing a diminished user experience on the part of the user. In other instances, the user may wish to create a custom wakeword to distinguish between different users of the user device (e.g., each user is assigned a different wakeword). The different wakewords may be associated with different configurations or capabilities of the user device, such as a wakeword assigned to a child that, when detected, configures the user device to disallow purchasing goods or services.

FIG. 1A illustrates a system for detecting a wakeword in an utterance from a user 10 by processing user audio 12 according to embodiments of the present disclosure. As explained herein, a user device 110 may include a neural network configured to distinguish between words in a vocabulary, such as a vocabulary of English, French, or other words, by recognizing words in the utterance corresponding to words in the vocabulary and then mapping the recognized words to corresponding points in an embedding space. The user device 110 may then compare those points to points known to be associated with wakewords (whether those known points are determined by a remote system and/or the user device itself). Although the steps of FIG. 1A, and other figures below, are discussed in a particular order, unless expressly stated otherwise the order of operations may be changed and still be within the scope of the present disclosure. Further, as illustrated in FIG. 1A, the steps may be performed by a combination of one or more user device (s) 110 and one or more remote systems 120, which may be connected over a network 199.

In various embodiments, the user device 110 determines (130) audio data corresponding to an utterance using, for example, audio captured by a microphone. The user device 110 processes (132), using a neural network (e.g., an embedding neural network), the audio data to determine a first vector (e.g., and data vector in N-dimensional embedding space) representing a word in the vocabulary.

In various embodiments of the present disclosure, the neural-network model (for example, a convolutional neural network or "CNN") is configured to map different words in a vocabulary represented in training audio data to different points in an N-dimensional mathematical space referred to herein as an "embedding space" that represents different words in the vocabulary as different points in the embedding space.

As described in greater detail herein, the neural-network model may be trained using dual copies of the model (which may be together referred to as a "Siamese" neural network). Each copy of the model may process different audio data; first audio data processed by the first copy may represent a first word, while second audio data processed by the second copy may represent the same or different word. The copies of the model may be trained such that the same or similar words are mapped to the same or similar points in the embedding space, while different words are mapped to different points in the embedding space. E.g., during training, if the same or similar words are not mapped to the same or similar points in the embedding space, the model is re-trained until they are.

The embedding space may be a representation of a number of values, each of which may be a vector of size N (e.g., the number of dimensions in the embedding space). For example, if N is 2, the embedding space is a two-dimensional plane defining a number of two-dimensional vectors, such as (x,y) points on the plane. If N is 3, the embedding space is a three-dimensional volume defining a number of three-dimensional vectors, such as (x,y,z) points in the volume. N may be any value; in some embodiments, N is 128 corresponding to a 128-dimensional embedding space defining a number of 128-dimensional vectors. If N is greater than 3, the embedding space may not correspond to a real-world analog such as a plane or a volume, but the higher-dimensional values of embedding spaces may behave similarly to the lower-dimensional values.

Each dimension of the embedding space may represent one or more properties of a given word that is represented in audio data. A dimension of the embedding space may correspond to a definable property of the word, such as length, number of syllables, types of sounds used to speak the word, and/or language of the word. Some or all of the dimensions of the embedding space may, however, not correspond to such definable properties and may simply result from training the neural-network model to differentiate between different words. In other words, while the size and type of the neural network may be designed by a human, and while the number of dimensions of the embedding space may be selected by a human, the actual embedding space (and the values represented therein) may be determined by training the neural-network model with the training data. For example, processing first audio data representing a first word using the neural-network model may result in a first set of values represented by a vector—a "feature vector"—for each of the N dimensions of the embedding space. This feature vector may thus correspond to a first point in the embedding space. The neural network may then process second audio data representing a second word to determine a second feature vector representing a second point in the embedding space. During training, however, if the first and second words are different, the first and second points in the embedding space may not be sufficiently different (e.g., they may be separated in the embedding space by a distance less than a threshold, such as a radius of a word cluster 506 illustrated in FIG. 7). The neural-network model may thus be re-trained (using, as described herein, a gradient descent algorithm) such that the first and second words correspond to new, third and fourth points in the embedding space that are separated by a distance greater than the threshold. Thus, as described above, the values of the feature vectors may not necessarily correspond to definable audio properties and are instead determined during training such that different words produce different points (and/or such that the same or similar words produce the same or similar points).

Once trained, one copy of the dual copies of the trained neural-network model (and/or neural-network model parameters related thereto) may be installed on (e.g., loaded into the storage of) the user device, which may then execute the model to process input audio data. With reference again to FIG. 1A, the user device 110 determines (134) a degree of similarity (e.g., a distance in N-dimensional embedding space) between the first vector and a second vector corresponding to a wakeword. The user device 110 determines (136) that the degree of similarity satisfies a condition (e.g., the distance is less than a threshold). The user device 110 may compare the output(s) of the model to vectors representing wakewords and may determine that a wakeword is represented in the audio data by determining a degree of similarity between the vectors and then determining that the degree of similarity satisfies a condition. The degree of similarity may be a distance between the vectors in the N-dimensional embedding space; the condition may be that the distance is less than a threshold. In some embodiments, the user device 110 may determine that the point in the embedding space corresponds to the wakeword by determining that the point lies within a shape in the embedding space associated with the wakeword, such as an ellipse. The user device may create additional wakewords by mapping a new word to a new point in the N-dimensional space and then using that new point as another point of comparison to the output of the neural-network model. Based on determining that the degree of similarity satisfies the condition, the user device 110 sends (138) at least a second portion of the audio data to a remote system (for, e.g., further speech processing).

As described herein, the user device may create a new wakeword by, for example, receiving a request to do so from the user 10. Referring to FIG. 1B, the user device 110 similarly determines (150) first audio data corresponding to a first utterance. The user device 110 then processes (152), using a neural network configured to distinguish between words in a vocabulary, at least a first portion of the first audio data to determine a first vector representing a word of the utterance. In other words, the user device 110 determines a point in the embedding space corresponding to the new wakeword. The user device 110 determines (154), using the user device, second audio data corresponding to a second utterance (e.g., a second utterance occurring at a later time). The user device 110 processes (156), using the neural network and the first vector, at least a first portion of the second audio data to determine that the second audio data includes a representation of the word (by, for example, determining that a second vector determined using the second audio data satisfies a condition). Based on the determination that the second audio data includes the representation, the user device 110 sends (158), to a remote system, at least a second portion of the second audio data.

Referring to FIG. 2, the user device 110 may receive the input audio 12 and, using an audio capture component such as a microphone or array of microphones, determine corresponding audio data. Before performing wakeword detection as described herein (e.g., activating one or more wakeword-detection components 220), the device 110 may use various techniques to first determine whether the audio data includes a representation of speech. For example, the device 110 may use a voice-activity detection (VAD) component to determine whether speech is present in the audio data based on various quantitative aspects of the audio data, such as the spectral slope between one or more frames of the first audio data, the energy levels of the first audio data in one or more spectral bands the signal-to-noise ratios of the first audio data in one or more spectral bands and/or other quantitative aspects. In some embodiments, the VAD component is a trained classifier configured to distinguish speech from background noise. The classifier may be a linear classifier, support vector machine, and/or decision tree. In still other examples, HMM or Gaussian mixture model (GMM) techniques may be applied to compare the audio data to one or more acoustic models in stored on the user device; the acoustic models may include models corresponding to speech, noise (e.g., environmental noise or background noise), and/or silence. In various embodiments, the VAD component may consume less power than the wakeword-detection component 220, thus providing a power savings when compared to continually processing audio data with the wakeword-detection component 220. In other embodiments, however, the wakeword-detection component 220 processes all received audio data, and the VAD component is not present or is not used.

If the VAD component is being used and it determines the audio data includes speech, the wakeword-detection component 220 may activate to process the audio data to determine if a wakeword is likely represented therein. Following detection of the wakeword, the user device 110 sends audio data 212, corresponding to at least an utterance following the wakeword in the audio data, to the remote system 120. The device 110 may further include an ASR component for determining text data corresponding to speech represented in the input audio 12 and may instead or in addition send this text data to the remote system 120.

As described in greater detail herein, the wakeword-detection component 220 may process the audio data using one or more trained models to detect a wakeword by determining audio embedding data, which may include one or more data vectors, and then comparing those data vectors to other data vectors corresponding to wakewords. The user device 110 may further include one or more additional wakeword-detection component(s) that include one or more additional trained models. These additional wakeword-detection component(s) may be used to confirm the result of the wakeword-detection component 220; that is, the user device 110 may perform additional audio processing only if two or more wakeword-detection components determine that the audio data represents a wakeword.

The additional trained models may be CNNs, deep neural networks (DNNs), recurrent neural networks (RNNs), acoustic models, HMMs, and/or classifiers. These additional trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use CNN/RNN structures directly, without using a HMM. The additional wakeword-detection component may estimate the posteriors of wakewords with context information, either by stacking frames within a context window for a DNN or by using a RNN. Follow-on posterior threshold tuning or smoothing may be applied for decision making. Other techniques for wakeword detection may also be used.

The remote system 120 may be used for additional audio processing after the user device 110 detects the wakeword. After wakeword detection and upon receipt by the system 120, the audio data 212 may be sent to an orchestrator component 230. The orchestrator component 230 may include memory and logic that enables the orchestrator component 230 to transmit various pieces and forms of data to various components of the system.

The orchestrator component 230 may send the audio data 212 to a speech-processing component 240. The speech-processing component 240 may include different components for different languages. One or more components may be selected based on determination of one or more languages. A selected ASR component 250 of the speech processing component 240 transcribes the audio data 212 into text data representing one more hypotheses representing speech contained in the audio data 212. The ASR component 250 may interpret the utterance in the audio data 212 based on a similarity between the utterance and pre-established language models. For example, the ASR component 250 may compare the audio data 212 with models for sounds (e.g., subword units, such as phonemes) and sequences of sounds to identify words that match the sequence of sounds spoken in the utterance represented in the audio data 212. The ASR component 250 sends (either directly or via the orchestrator component 230) the text data generated thereby to a corresponding selected NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts, based on the selected language, to make a semantic interpretation of the words represented in the text data input thereto. That is, the NLU component 260 determines one or more meanings associated with the words represented in the text data based on individual words represented in the text data. The NLU component 260 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 260 may determine a user intended the system to output the song Africa performed by the band Toto, which the NLU component 260 determines is represented by a "play music" intent.

The orchestrator component 230 (or another component of the system 120) may send NLU results data to a speechlet component 290 associated with the intent. The speechlet component 290 determines output data based on the NLU results data. For example, if the NLU results data includes intent data corresponding to the "play music" intent and tagged text corresponding to "artist: Toto," the orchestrator 230 (or other component of the system 120) may send the NLU results data to a music speechlet component, which determines Toto music audio data for output by the system.

A "speechlet" may be software running on the system 120 that is akin to an application. That is, a speechlet may enable the system 120 to execute specific functionality in order to provide data or produce some other output requested by the user 10. The system 120 may be configured with more than one speechlet. For example, a weather speechlet may enable the system 120 to provide weather information, a ride-sharing speechlet may enable the system 120 to book a trip with respect to a taxi or ride sharing service, and a food-order speechlet may enable the system 120 to order a pizza with respect to a restaurant's online ordering system.

In some instances, a speechlet 290 may provide output text data responsive to received NLU results data. The system 120 may include a text-to-speech (TTS) component 280 that generates output audio data from speechlet-provided output text data. The TTS component 280 may use one of a variety of speech-synthesis techniques. In one method of synthesis called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

In various embodiments, a component of the remote system 120, such as the NLU component 260 and/or a speechlet 290, determines that the intent of the user 10 is to create a new wakeword. For example, the ASR component 250 may determine that the text data corresponds to utterances such as, "Alexa, create a new wakeword" or "Alexa, set your wakeword to 'Jarvis.'" Upon determination of this intent (as described above), the remote system 120 may send an indication to a wakeword-creation component 222 of the user device 110, which may then determine, using the original audio data, a data vector that represents a point in the N-dimensional embedding space corresponding to the new wakeword. The user device 110 may, in some embodiments, prompt the user to utter the wakeword one or more additional times (or one or more times, if the original audio data did not include the representation of the wakeword). In some embodiments, the remote system 120 includes a library of data vectors corresponding to wakewords, may select one data vector based on input from the user 10, and may send this selected data vector to the wakeword-creation component 222. In some embodiments, the remote system 120 sends a request to another system, such as a media streaming service, for the data vector and receives it in response.

The system 120 may include a user-recognition component 295. The user-recognition component 295 may determine a user account associate with an utterance represented in audio data or may simply determine an identity of a speaker of an utterance represented in the audio data. The user-recognition component 295 may receive the audio data 212 and/or text data output by the ASR component 250. The user-recognition component 295 may determine scores indicating whether the speech represented in the audio data 212 originated from a particular user or speaker. For example, a first score may indicate a likelihood that the speech originated from a first user or speaker and a second score may indicate a likelihood that the speech originated from a second user or speaker. The user-recognition component 295 may also determine an overall confidence regarding the accuracy of user recognition operations. The user-recognition component 295 may perform user recognition by comparing audio characteristics in the audio data 212 to stored audio characteristics of users. The user-recognition component 295 may also perform user recognition by comparing biometric data (e.g., fingerprint data, iris data, etc.) received by the system in correlation with the audio 12 to stored biometric data of users. The user-recognition component 295 may further perform user recognition by comparing image data (e.g., including a representation of at least a feature of a user) received by the system in correlation with the audio 12 with stored image data (e.g., including representations of features of users). The user-recognition component 295 may perform additional user recognition processes. Output of the user-recognition component 295 may be used to inform NLU processing as well as processing performed by speechlets 290. Output of the user-recognition component 295 may similarly be used during training to determine an identity of a speaker of training data; this output may be incorporated into a similarity indication 312 (as described below with reference to FIG. 3).

The system 120 may include a user-profile storage 270. The user profile storage 270 may include a variety of information related to individual users and/or groups of users that interact with the system 120. The user-profile storage 270 may include one or more user profiles. Each user profile may be associated with a different user ID. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 270 is implemented as part of the system 120. The user profile storage 270 may, however, may be disposed in a different system in communication with the system 120, for example over the network 199. User-profile data may be used to inform NLU processing as well as processing performed by a speechlet 290.

The user profile storage 270 includes data regarding individual user profiles. Each user profile may include information indicating various devices, output capabilities of each of the various devices, and/or a location of each of the various devices. The device-profile data represents a profile specific to a device. For example, device profile data may represent various user profiles that are associated with the device, speech processing that was performed with respect to audio data received from the device, instances when the device detected a wakeword, etc. In contrast, user-profile data represents a profile specific to a user.

In some implementations, the system 120 may receive audio data 212 from the device 110 as well as receive an indication from the device 110 that the device 110 detected a wakeword. The system 120 may include its own wakeword-detection component that may be used to confirm that the wakeword is present in the audio data 212 using a neural-network model. The neural-network model of the system 120 may more accurately determine presence of the wakeword in the audio data 212 because the model may include more nodes and/or layers than that of the wakeword-detection component 220 of the user device 110. Verification of the presence of the wakeword may be beneficial if the device 110 performs unreliable wakeword detection or, at least, less-reliable wakeword detection than the system 120.

FIG. 2 illustrates the wakeword-creation component 222 disposed on the user device 110 and the speech-processing component 240 (and other associated components) disposed on the remote system 120. The present disclosure is not, however, limited to only this disposition of components. In other embodiments, some or all of the speech-processing component 240 (and other associated components) is instead or in addition disposed on the user device 110. For example, the user device 110 may include an ASR component 250 and/or an NLU component 260. These components may be less sophisticated than corresponding components disposed on the remote system 120; the ASR component of the user device 110 may be configured to recognize only a subset of words represented in audio data, and the NLU component of the user device 110 may be configured to understand only a subset of possible intents. These subsets may correspond to common commands able to be executed by the user device 110 (e.g., "Alexa, turn on the television") but may exclude commands requiring more sophisticated speech processing (e.g., "Alexa, is there a romantic restaurant nearby that has reservations next Thursday?"). The subset of commands may include creation of a new wakeword, as described herein.

Similarly, the wakeword-creation component 222 may instead or in addition be disposed on the remote system 120. The user device 110 may thus capture audio data that corresponds to a request to create a new wakeword and send that audio data to the remote system 120. The remote system 120 may process the audio data to determine that the intent of the user 10 is to create a new wakeword and then use its own wakeword-creation component to determine a data vector corresponding to the wakeword. The remote system 120 may then transmit the data vector to the user device 110, which may then use it to process audio data, as described herein.

FIG. 3 illustrates a system for training an embedding neural network 302 to distinguish between words in a vocabulary in accordance with embodiments of the present disclosure. As mentioned above, the embedding neural network 302 may be trained by creating two identical copies of the neural network: a first embedding neural network 302a and a second embedding neural network 302b. The first embedding neural network 302a may process first audio data 304, while the second embedding neural network 302b may process second audio data 306. The first embedding neural network 302a may determine first audio embedding data 308, and the second embedding neural network 302b may determine second audio embedding data 310.

The audio data 304, 306 may be a digital representation of an audio signal, such as a series of numbers that represent amplitudes of the audio signal over time. The digital representation may correspond to a sampling of real-world audio, in which the analog real-world audio is represented by a series of discrete digital values. One or more microphones of the user device 110 may, for example, react to audio, such as an utterance, such that one or more membranes of the microphone move (e.g., are displaces) in response to pressure caused by the audio. Electrical signals connected to the membrane may change in response to the pressure; these changes may then be transduced into electrical voltages and/or currents having magnitudes that correspond to the amount of displacement.

The sampling frequency may be, for example, 128 kHz. The audio data 304, 306 may further be arranged into a number of frames of audio; each frame may represent a duration of time of the real-world audio. This duration of time may be, for example, 10 milliseconds. A windowing component may perform windowing functions on the audio data 304, 306 to create framed audio data. The frames may overlap; each frame may, for example, include twenty-five (25) milliseconds of audio data, with an overlap of the next frame of 10 milliseconds of data, thus resulting in sliding window processing of audio data. Performing the windowing may include multiplying a time record by a finite-length window with an amplitude that varies smoothly and gradually toward zero at its edges. By performing such, the endpoints of the waveforms of respective frames of audio data meet, resulting in a continuous waveform without sharp transitions The audio data 304, 306 may also or in addition represent frequencies of the audio as produced by, for example, a Fourier transform. The audio data 304, 306 may further include a spectrogram of the audio, such as a Mel-spectrogram, a cestrum of the audio data, or other such processed version of the audio. The present disclosure is not limited to any particular format of the audio data 304, 306. An FFT component may, for example, perform a fast Fourier transform (FFT) that converts the waveforms in each frame of the framed audio data from its original domain (e.g., time) to processed audio data, which may be a representation in a frequency domain (thereby creating frequency domain framed audio data). Audio processing techniques other than or in addition to FFT may be used to transform audio data (e.g., waveforms) into data that can be processed as needed.

The first audio data 304 may represent a first word or phrase; the second audio data 306 may represent a different version of the same first word or phrase. The different version of the same word or phrase may differ from that of the first in that it may be, for example, spoken by a different speaker, at a different tempo or pitch, with a different accent, and/or with or without background noise, such as other speech. The second audio data 306 may instead represent a different word or phrase with respect to that of the first audio data 304.

A similarity indication 312 may indicate whether the second audio data 306 represents either a different version of the same word or phrase represented in the first audio data 304 (herein referred to as "similar" audio data) or a different word or phrase (herein referred to as "dissimilar" audio data). In some embodiments, the similarity indication 312 includes a binary indication, such as a 0 or a 1, wherein the binary indication denotes similarity or dissimilarity. In other embodiments, the similarity indication 312 includes a range of values that represent a degree of similarity, wherein one end of the range corresponds to complete similarity while the other end of the range corresponds to complete dissimilarity. For example, the same words spoken by the same speaker in the same manner may be completely similar, while different words spoken by different speakers in different manners may be completely dissimilar. Two similar but different words spoken by the same speaker in the same manner may, however, be partially similar.

As mentioned above, the audio data 304, 306 may be selected from training data created from recorded human speech (e.g., from a voice actor or actors) and/or created using, for example, the TTS component 280 described above. Which item of first audio data 304 is paired with which item of second audio data 306 may be determined based on user input and/or determined randomly. In some embodiments, the training data consists of a corpus consisting of many items of audio data, and the first audio data 304 and second audio data 306 are determined by randomly or pseudo-randomly selecting them from the corpus.

The similarity indication 312 may be determined from metadata associated with the first audio data 304 and the second audio data 306. For example, the corpus of audio data may be annotated to include the metadata, which may include an indication of whether each pair of audio data 304, 306 is similar or dissimilar. In other embodiments, the system 120 may determine the similarity indication by processing the first audio data 304 and the second audio data 306 to determine the degree of similarity. For example, the system 120 may compare a spectrogram of the first audio data 304 to a spectrogram of the second audio data 306 and determine that they are similar if a cross-correlation of the spectrograms is within a threshold. The user-recognition component 295 described with reference to FIG. 2 may be used to determine an identity of a speaker of the audio data 304, 306 if the embedding neural network 302 is to be configured to distinguish between speakers (as described with reference to FIGS. 4A and 4B). An output of the user-recognition component 295 may thus be included in the similarity indication 312.

Figure 9:
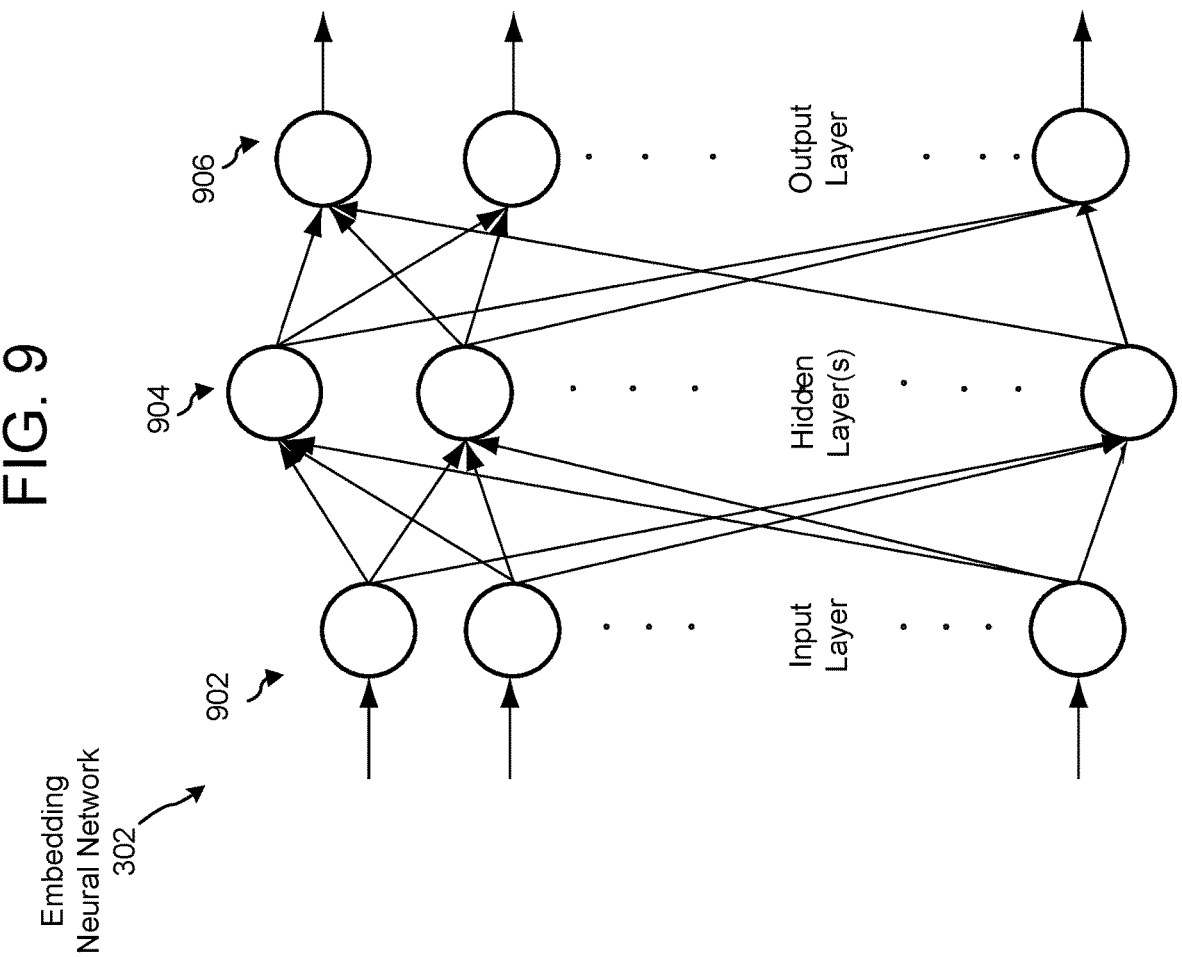
FIG. 9 illustrates a neural network according to embodiments of the present disclosure.

With reference also to FIG. 9, the embedding neural network 302 may include a neural network, such as a DNN or CNN, that includes a number of nodes. Each node may receive one or more inputs, which may be the audio data 304, 306 and/or outputs of other nodes. A node may modify its inputs by applying (e.g., multiplying) each input by a variable neural-network parameter, such as a weight, and sum the results to determine its output. A node may further modify its inputs by adding another variable neural-network parameter, such as an offset, to the result of the summation. The embedding neural network 302 may further apply a mathematical operation to the audio data 304, 306, such as a convolution operation. The nodes may be arranged in layers such that, for example, a first layer receives and processes the audio data 304, 306, a second layer receives and processes the output of the first layer, and so on. Each layer may have the same or a different number of nodes. In various embodiments, the embedding neural network 302 has 8 layers, each with 100 nodes.

The embedding neural networks 302 may process the audio data 304, 306 in groups of frames, referred to herein as "windows," which may overlap (e.g., two windows may include some of the same frames). For example, in a first step, the embedding neural network 302a may process, with a first layer, a first window of the first audio data 304 consisting of frames 0-10. In a second step, the embedding neural network 302a may process, with the first layer, a second window of the first audio data 304 consisting of frames 1-11. During this second step, a second layer of the embedding neural network 302a may process the output of the first layer (e.g., the result of the first layer processing the first window). The size of the window may correspond to the number of nodes in the first layer. This processing of the windows may continue until no further windows of the audio data 304, 306 remain to be processed; the user device 110 may continually process windows of audio data.

The audio embedding data 308, 310 may include one or more vectors of dimension N ("data vectors"). As mentioned above, N may be any size; in some embodiments, N is 128. Each data vector may include N values; these values may represent various audio characteristics of the word or phrase represented in the audio data 304, 306. Each of the values may fall in the same range, such as 0.0-1.0; in other embodiments, some or all of the values may fall into different ranges. The values may correspond to identifiable characteristics, such as pitch, tempo, phones, and/or word length; in other embodiments, the values do not correspond to identifiable characteristics and their type is determined by training the embedding neural network 302.

The audio embedding data 308, 310 may be determined after all of the windows have been processed. The values of the data vector of the audio embedding data 308, 310 thus represents a condensing or "embedding" of the one or more characteristics of each frame of the word represented in the audio data 304, 306. The duration of the audio data 306, 306 may vary; for example, short words represented in the audio data 304, 306 may have a shorter duration than longer words. Because the size of the data vector may be fixed for all words, however, each word may be similarly mapped to the N-dimensional embedding space, regardless of its duration.

A neural-network training component 314 may process the audio embedding data 308, 310 and, in some embodiments, the similarity indication 312 to determine one or more sets of neural-network parameters 316, which are used by both the first embedding neural network 302a and the second embedding neural network 302b. The neural-network training component 314 may compare the first audio embedding data 308 and the second audio embedding data 310 to determine a degree of similarity therebetween. In some embodiments, the neural-network training component 314 computes a distance, such as a cosine or Euclidian distance, between the first audio embedding data 308 and the second audio embedding data 310. This distance may represent the distance between a first data vector of the first audio embedding data 308 and a second data vector of the second audio embedding data 310 in the N-dimensional embedding space.

The neural-network training component 314 may determine updated neural-network parameters 316 based on the distance and the similarity indication 312. If the similarity indication 312 indicates that words represented by the first audio data 304 and the second audio data 306 are similar, it may determine whether the distance is less than a first threshold. If the distance is less than the first threshold, the neural-network training component 314 may not change the neural-network parameters 316. If the distance is greater than the first threshold, however, the neural-network training component 314 may change the neural-network parameters 316 such that the embedding neural networks 302, when using the changed parameters 316 to process the same first audio data 304 and the same second audio data 306, produce data vectors having a distance less than the threshold.

In other words, distance in the N-dimensional embedding space corresponds to a degree of similarity between words; more similar words are closer to each other while less similar words are farther from each other. Variations of the same word spoken by different speakers or by the same speaker in different ways are closer together in the N-dimensional embedding space than different words. Thus, when the embedding neural networks 302 process audio data 304, 306 representing variations of the same word (e.g., similar words), their output data vectors should corresponding be "close" to each other in the N-dimensional embedding space. If they are not, the neural network training component 314 determines neural network parameters 316 (via, e.g., gradient descent) that cause the distance between the data vectors to shrink.

Similarly, if the similarity indication 312 indicates that the words represented by the audio data 304, 306 are dissimilar, the neural-network training component 314 may compare the distance between the resultant data vectors to a second threshold (which may be the same as or different than the first threshold). Here, if the distance is greater than the second threshold, the neural network training component 314 may not change the neural-network parameters 316. If, however, the distance is less than the second threshold, the neural network training component 314 may change the neural-network parameters 316 such that the embedding neural networks 302, when using the changed parameters 316 to process the same first audio data 304 and the same second audio data 306, produce data vectors having a distance greater than the threshold.

The threshold(s) may be determined via experimentation. If, when training of the embedding neural networks 302 is complete, points in the N-dimensional embedding space corresponding to dissimilar words are closer together than points in the N-dimensional embedding space corresponding to similar words, the threshold may be decreased (e.g., assigned a smaller value corresponding to smaller distance). If training of the embedding neural networks 302 fails to complete, the threshold may be increased (e.g., assigned a greater value corresponding to greater distance). Training of the embedding neural networks 302 may be deemed complete when, for example, a model accuracy threshold is achieved.

Various techniques may be used to train the embedding neural networks 302, including back-propagation, statistical learning, supervised learning, semi-supervised learning, stochastic learning, or other such techniques. Supervised learning refers to a technique in which a model may be configured to infer a function from labeled training data. Thus, a computing system may use training data in the form of training examples (e.g., pairs of audio data 304, 306) that provide examples of the kinds of input data the model will be configured to process at runtime, as well as an accompanying "ground truth" (e.g., the similarity indication 312) for each training example. The ground truth provides the correct response for the respective training example, thus providing a complete example that can be used to train the model. Other data that may be used to train a model may include training parameters such as error functions, weights, or other data that can be used to guide the training of a model.

FIGS. 4A and 4B illustrate example training audio data 400a, 400b for input to the embedding neural networks 302. As mentioned above, pairs 1 . . . M of first audio data 304 and second audio data 306 may be determined by, for example, randomly selecting audio data from a training corpus. For each pair of audio data, the similarity indication 312 may be determined by receiving metadata corresponding to the pair and/or by comparing the audio data in each pair to determine its degree of similarity.

Referring first to FIG. 4A, items of audio data may correspond to the same or different words and/or the same or different speakers. If the pairs of items correspond to the same speaker and same word, the corresponding similarity indication indicates that they are similar. If the pairs of items correspond to different words, the corresponding similarity indication indicates that they are dissimilar. As shown in FIG. 4A, however, if the pairs of items correspond to the same word but different speakers, in some embodiments, the similarity indication indicates that they are similar. Thus, in these embodiments, the embedding neural network 302 is configured to not distinguish between speakers and the resultant wakeword-detection component 220 is agnostic to the identity of the person speaking. As shown in FIG. 4B, however, if the pairs of items correspond to the same word but different speakers, in other embodiments, the similarity indication indicates that they are dissimilar. Thus, in these embodiments, the embedding neural network 302 is configured to distinguish between speakers and the resultant wakeword-detection component 220 depends on the identity of the person speaking (e.g., the wakeword-detection component 220 may determine that a wakeword was spoken by a first person but not when that same word is spoken by a second person).

Distinguishing not only between different words but also different speakers of those words, in accordance with a model built using the training data depicted in FIG. 4B, may require more computing resources than distinguishing between only different words, in accordance with a model built using the training data depicted in FIG. 4A. The former model may require more layers, more nodes per layer, a greater value of N, and/or more precision (e.g., more significant figures) for the values of the data vector compared to the latter model. The additional resources may be determined via experimentation; if, after training, the trained model fails to differentiate between different speakers, resources may be added incrementally and the model re-trained.

Figure 5:
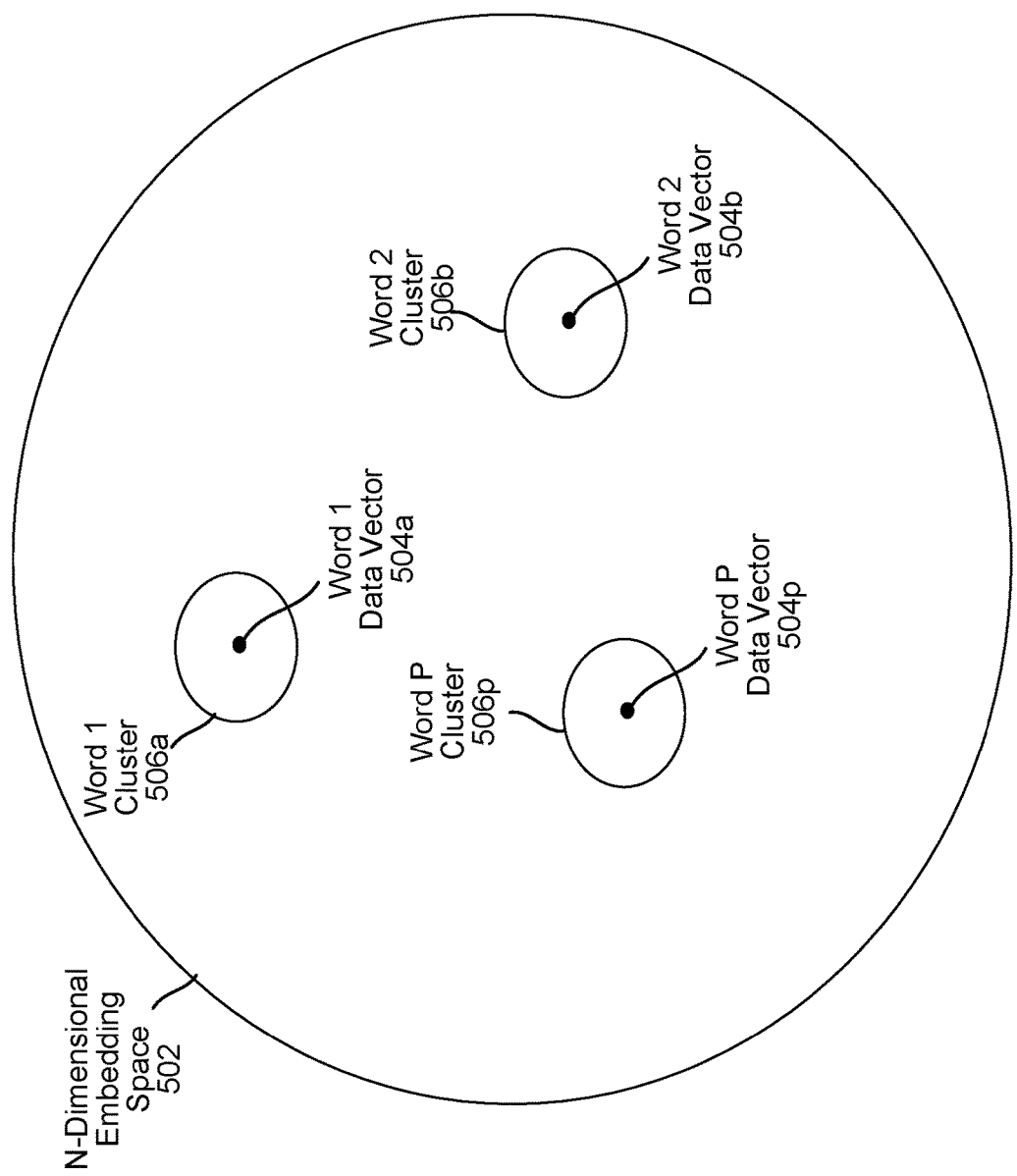
FIG. 5 illustrates an N-dimensional embedding space according to embodiments of the present disclosure.

FIG. 5 illustrates an N-dimensional embedding space 502. Though the N-dimensional embedding space 502 is depicted as a finite, two-dimensional plane, the N-dimensional embedding space 502 may have any value of N (e.g., any dimension) and may extend to infinity in any dimension. Further, FIG. 5 illustrates points corresponding to P data vectors 504 (which represent to P words), but the N-dimensional embedding space 502 may include any number points defined by any number of data vectors 504.

As mentioned above, similar words have points closer together in the N-dimensional embedding space 502 than do dissimilar words. Two or more similar words may be disposed inside a cluster 506 in the N-dimensional embedding space 502; no dissimilar words may be disposed inside the cluster 506. The radius (which may be an N-dimensional radius) of the cluster 506 may be the threshold of the training component 314 described above. The values of the data vectors of all the similar words in each cluster 506 may be averaged to determine the point of the data vector 504. As explained above, the similarity indication 312 may be configured such that the same words spoken by different speakers may or may not lie inside clusters 506.

Figure 6:
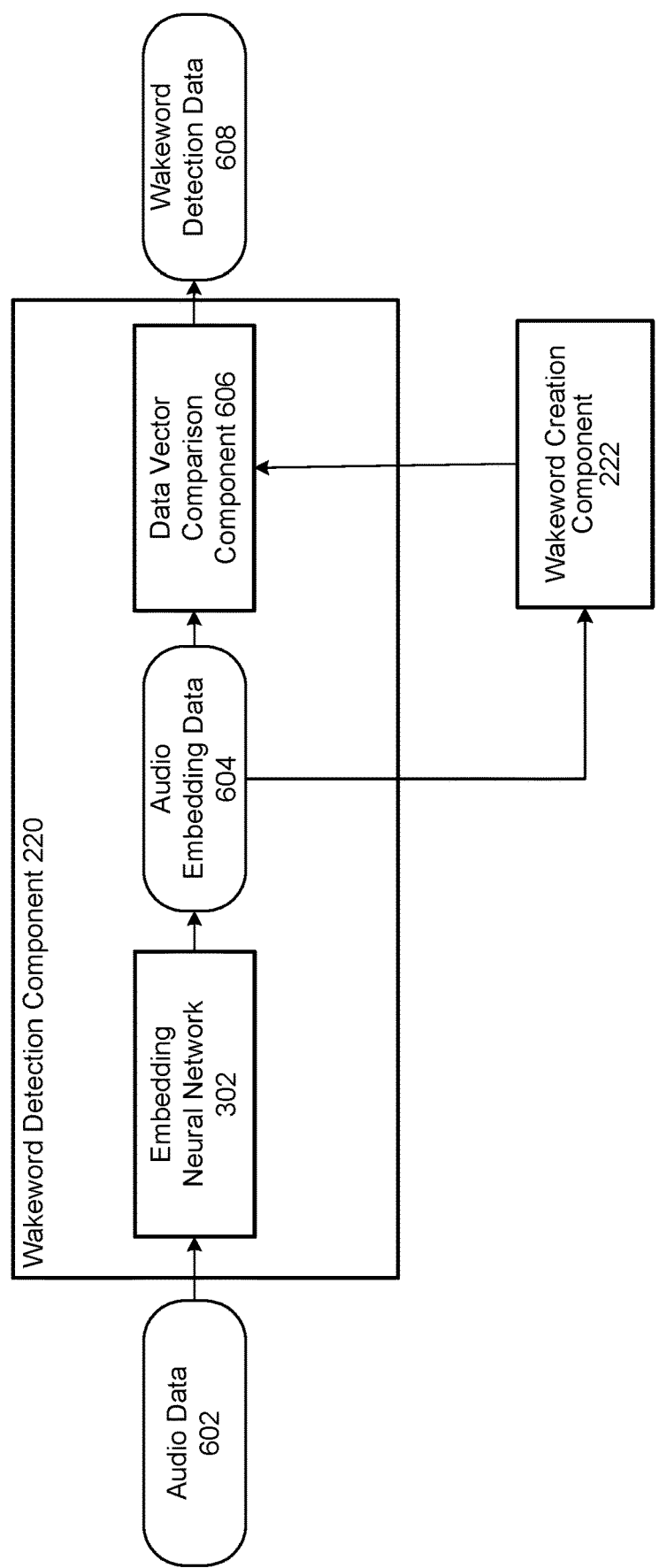
FIG. 6 illustrates a system for detecting a wakeword according to embodiments of the present disclosure.

FIG. 6 illustrates the wakeword-detection component 220 and the wakeword-creation component 222 of the user device 110. The wakeword-detection component 220 includes one of the embedding neural networks 302 trained in accordance with the disclosure above corresponding to FIG. 3. The embedding neural network 302 may be configured in accordance with the neural network parameters 316 determined during training. The embedding neural network 302 may receive audio data 602 from one or more microphones of the user device 110; data from the microphones may be first processed (e.g., amplified or otherwise transformed) to determine the audio data 602.

The embedding neural network 302 determines audio embedding data 604 by processing the audio data 602. The audio embedding data 604 is similar in form to the audio embedding data 308, 310 discussed above; e.g., it may also include one or more data vectors having values that embed information related to one or more characteristics of the audio data 602. The actual values of the data vector of the audio embedding data 604 may differ, however, at least because the input audio data 602 likely differs from the training audio data 304, 306.

A data vector comparison component 606 compares one or more data vectors of the audio embedding data 604 to one or more data vectors that correspond to wakewords to determine a degree of similarity therebetween. This degree of similarity may correspond to a distance measurement, such as a cosine or Euclidian distance measurement, that determines a distance between the data vectors 504 in the N-dimensional embedding space 502. The user device 110 may store the one or more data vectors corresponding to the one or more wakewords in a computer memory. These wakeword data vectors may be determined by, for example, the remote system 120 and then transmitted to the user device 110. The remote system 120 may determine the wakeword data vectors by processing one or more items of audio data that represent the wakeword using the embedding neural network 302 and averaging its outputs, as described herein.

The data vector comparison component 606 determines wakeword detection data 608; this data may indicate that the wakeword is represented in the audio data 602 if the distance between data vectors satisfies a condition, such as being less than a threshold. This threshold may be the same threshold as described above with reference to FIGS. 3 and 5 (e.g., determined experimentally and/or determined based on a radius of a cluster 506). In some embodiments, the user device 110 may raise or lower the threshold in response to a request from the user and/or upon determining that a number of false-positive and/or false-negative detections of the wakeword is less or greater than a threshold.

The wakeword-creation component 222 may determine a new wakeword for the user device 110. As described above, the remote system 120 may determine that the user intends to create a new wakeword and may send an indication thereof to the wakeword-creation component 222. In other embodiments, the user device 110 determines that the user intends to create the new wakeword. The TTS component of the remote system 120 (and/or a TTS component of the user device 110) may create audio data corresponding to an audio prompt or other such instructions to user device 110 for output. These instructions may include, for example, a request to speak or repeat the new wakeword or an indication that the wakeword was successfully created.

The wakeword-creation component 222 may determine that the audio data 602 includes one or more representations of the new wakeword and determine corresponding audio embedding data 604 (e.g., one or more data vectors that correspond to the one or more representations). If there is more than one representation, the wakeword-creation component 222 may average the corresponding data vectors. Once the resultant data vector for the new wakeword is determined, the wakeword-creation component 222 may send it to the data vector comparison component 606. The data vector comparison component 606 may then commence comparing data vectors of the audio embedding data 604 to the data vector of the new wakeword and, as described above, indicate that the new wakeword has been detected when the distance between them is less than the threshold. The data vector comparison component 606 may continue to compute distance between the data vectors of the audio embedding data 604 to the data vector of the old wakeword or may cease doing so. The data vector comparison component 606 may compute distances for any number of wakewords. The wakeword detection data 608 may further include an indication of which wakeword was detected and/or identification information corresponding to the speaker of the wakeword.

The wakeword-creation component 222 may instead or in addition receive a data vector for a new wakeword from the remote system 120 (and/or other system) as described above. The wakeword-creation component 222 may similarly send this data vector to the data vector comparison component 606, which may similarly use it to compute distances to data vectors in the audio embedding data 604.

Figure 7:
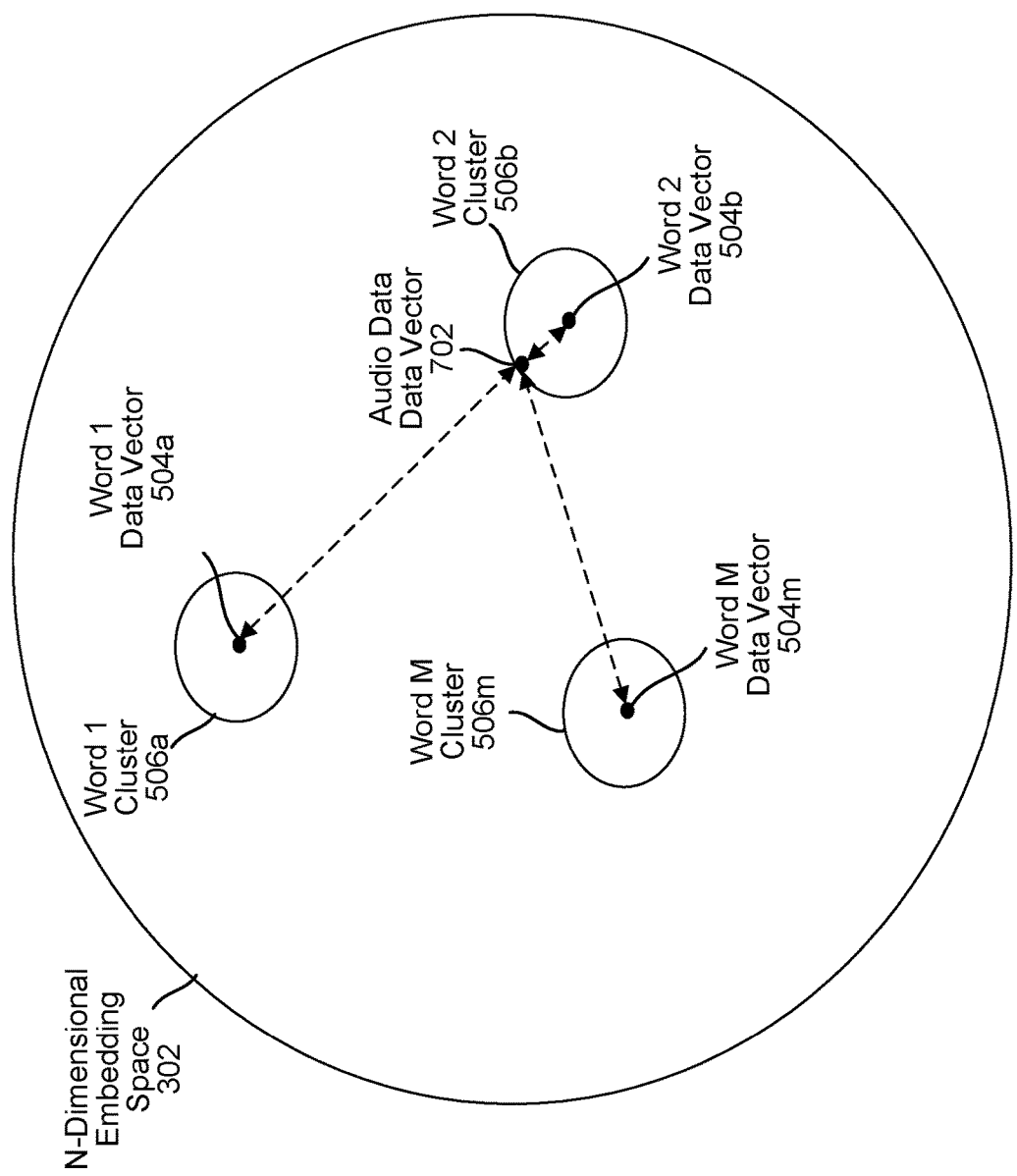
FIG. 7 illustrates an audio data vector mapped into an N-dimensional embedding space according to embodiments of the present disclosure.

FIG. 7 illustrates a point corresponding to an audio data vector 702 as determined by the embedding neural network 302. As described above, the data vector comparison component 606 determines distances between it and a number of other points in the N-dimensional embedding space 502. In this example, a first distance between the audio data vector 702 and a data vector 504a of a first word and a second distance between the audio data vector 702 and a data vector of an Mth word are greater than a threshold and thus, if word 1 and word M were wakewords, the wakeword-detection component 220 would not deem the word corresponding to the audio data vector 702 as triggering the wakeword. On the other hand, because a third distance between the audio data vector 702 and a data vector 504b of a second word is less than a threshold (e.g., within the cluster 506b), if the second word is a wakeword, the wakeword-detection component 220 would deem the word corresponding to the audio data vector 702 as triggering the wakeword.

Figure 8:
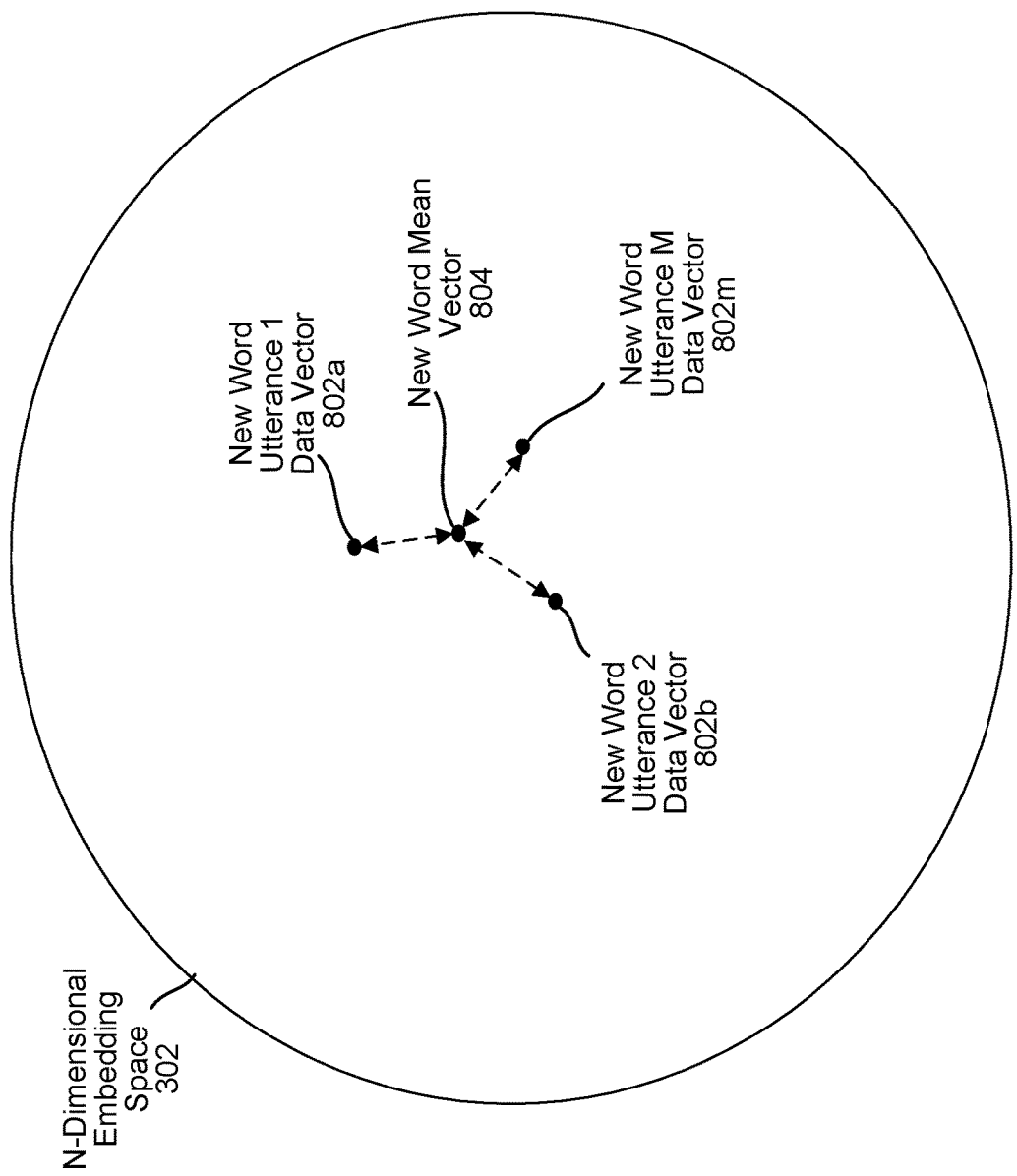
FIG. 8 illustrates a data vector of a new wakeword mapped into an N-dimensional embedding space according to embodiments of the present disclosure.

FIG. 8 illustrates one embodiment of the wakeword-creation component 222 creating a mean vector 804 corresponding to a new wakeword. As described above, the wakeword-creation component 222 may determine data vectors 802 corresponding to two or more utterances of the new wakeword, and may average them to determine the new wakeword mean vector 804. Averaging of the data vectors may include computing the average of each value of the data vector.

In various embodiments, the embedding neural network 302 may be used to recognize words other than the wakeword. The remote system 120 and/or user device 110 may determine a number of words corresponding to a subset of commands capable of being executed by the remote system 120 and/or user device 110. The remote system 120 and/or user device 110 may determine data vectors corresponding to these words and process the audio embedding data 604 using these data vectors (instead of or in addition to using any data vectors corresponding to a wakeword). When the data vector comparison component 606 determines a sequence of words corresponding to a command, the user device 110 may then execute that command.

Figure 10:
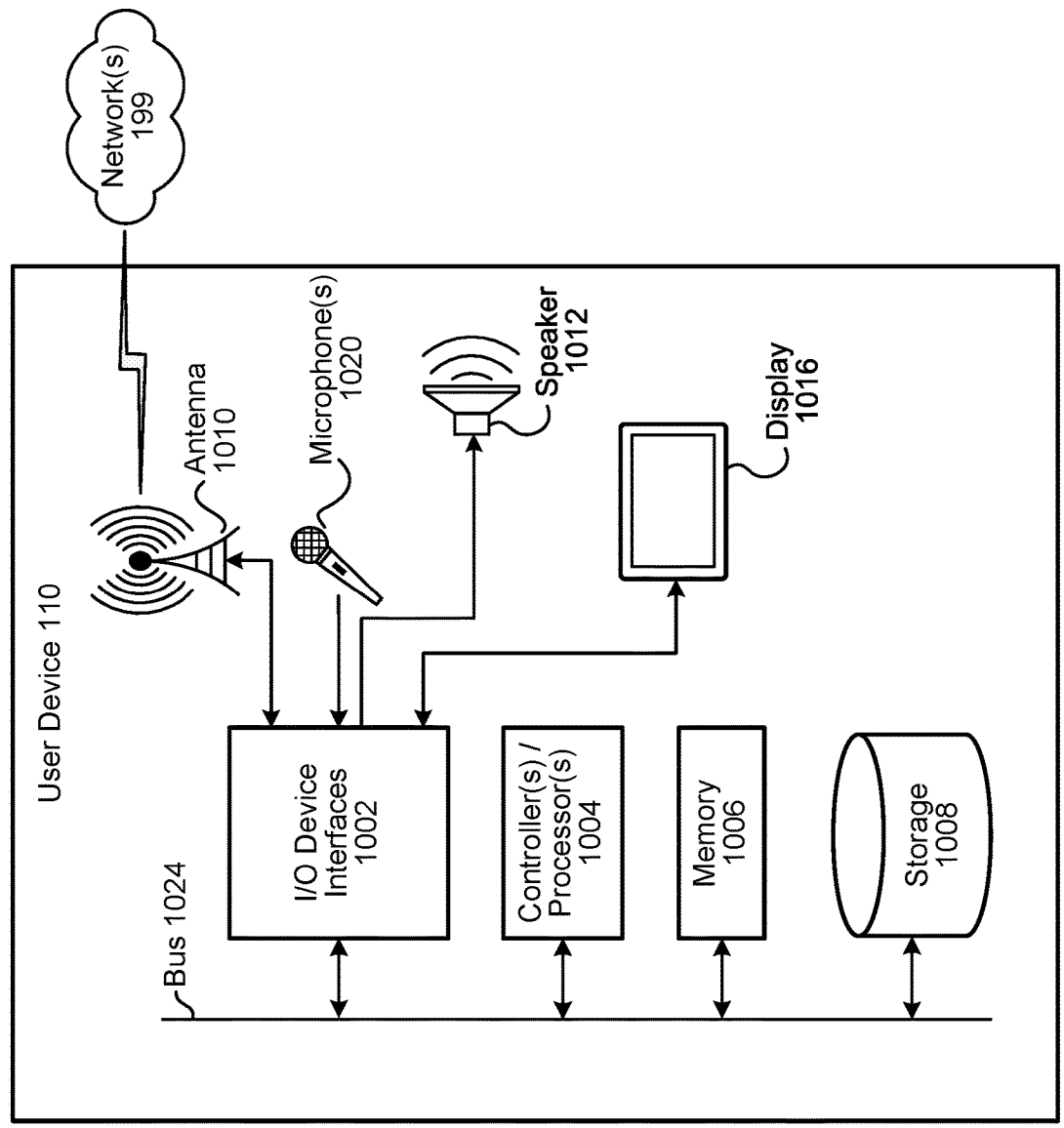
FIG. 10 illustrates example components of a user device according to embodiments of the present disclosure.

An example neural network, which may be the embedding neural network 302, is illustrated in FIG. 10. The neural network may include nodes organized as an input layer 902, one or more hidden layer(s) 904, and an output layer 906. The input layer 902 may include m nodes, the hidden layer(s) 904 n nodes, and the output layer 906 o nodes, where m, n, and o may be any numbers and may represent the same or different numbers of nodes for each layer. The neural network may be referred to as a "deep" neural network (DNN) if it includes one or more hidden layers 904 or a "convolutional" neural network (CNN) if the layers perform a convolution function on the input data.

Nodes of the input layer 902 may receive inputs (e.g., the audio data 602), and nodes of the output layer 906 may produce outputs (e.g., the audio embedding data 604). Each node of the hidden layer(s) 904 may be connected to one or more nodes in the input layer 902 and one or more nodes in the output layer 906. Although the neural network illustrated in FIG. 10 includes a single hidden layer 904, other neural networks may include multiple hidden layers 904; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

A neural network may also be constructed using recurrent connections such that one or more outputs of the hidden layer(s) 904 of the network feeds back into the hidden layer(s) 904 again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Figure 11:
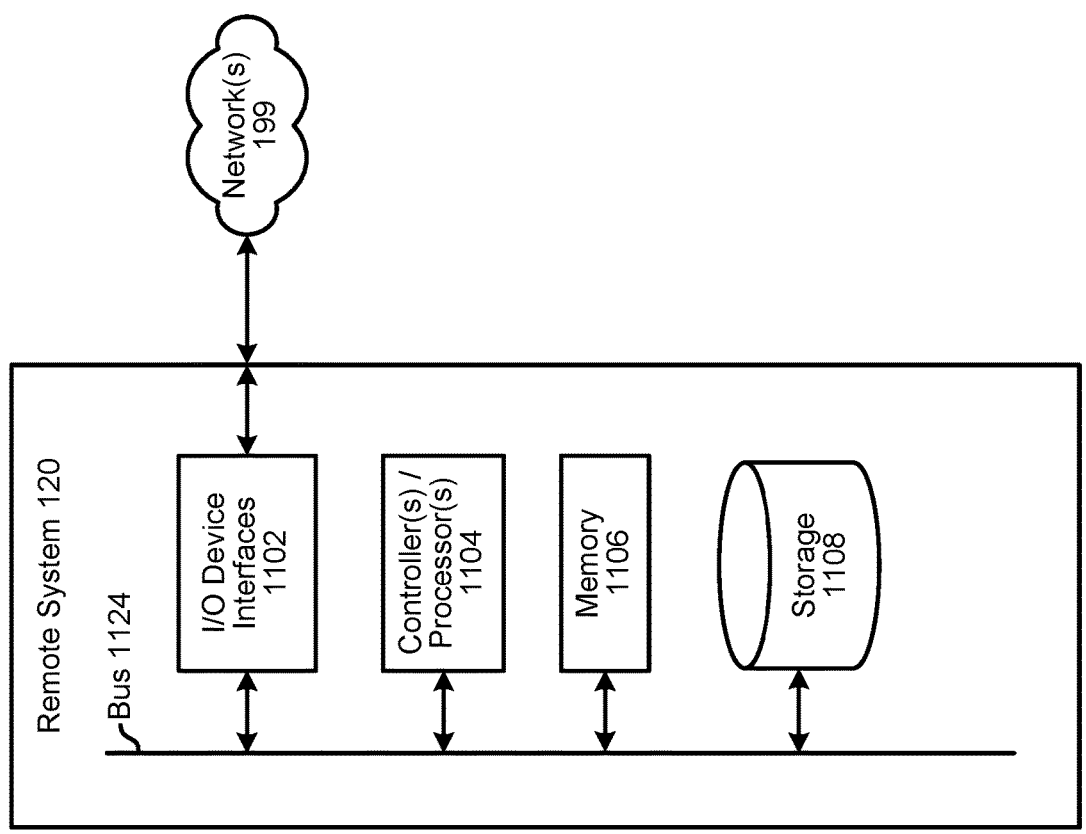
FIG. 11 illustrates example components of a remote system according to embodiments of the present disclosure.

FIG. 10 is a block diagram conceptually illustrating the user device 110. FIG. 11 is a block diagram conceptually illustrating example components of the remote system 120. Either the user device 110, the remote system 120, or some combination thereof may perform the wakeword and/or acoustic event detection as described herein. The remote system 120 may be a server. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple remote systems 120 may be used, such as one or more servers for performing various operations. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the user device 110 may include input/output device interfaces 1002 that connect to a variety of components such as an audio output component such as a speaker, a wired headset or a wireless headset, or other component capable of outputting audio. The device 110 may also include an audio capture component. The audio capture component may be, for example, a microphone or array of microphones, a wired headset or a wireless headset (not illustrated), etc. If an array of microphones is included, approximate distance to a sound's point of origin may be determined by audio localization based on time and amplitude differences between sounds captured by different microphones of the array. The device 110 may additionally include a display 1016 for displaying content. The device 110 may further include a camera. One or more device(s) 110 may capture audio data that may be used for purposes of acoustic event detection as described herein. The audio captured, and resulting audio data, may be used as described herein to detect and locate (for example within the audio data) a representation of an acoustic event.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the user device 110 or the remote system 120 may include their own dedicated processors, memory, and/or storage. Alternatively, one or more of the components of the device(s) 110 or the remote system 120 may utilize the I/O interfaces (1002/1102), processor(s) (1004/1104), memory (1006/1106), and/or storage (1008/1108) of the device(s) 110 or server(s) 120, respectively.

As noted above, multiple devices may be employed in a single system. In such a multi-device system, each of the devices may include different components for performing different aspects of the system's processing. The multiple devices may include overlapping components. The components of the device 110 and the server(s) 120 as described herein, are illustrative, and may be located as a stand-alone device or may be included, in whole or in part, as a component of a larger device or system.

Figure 12:
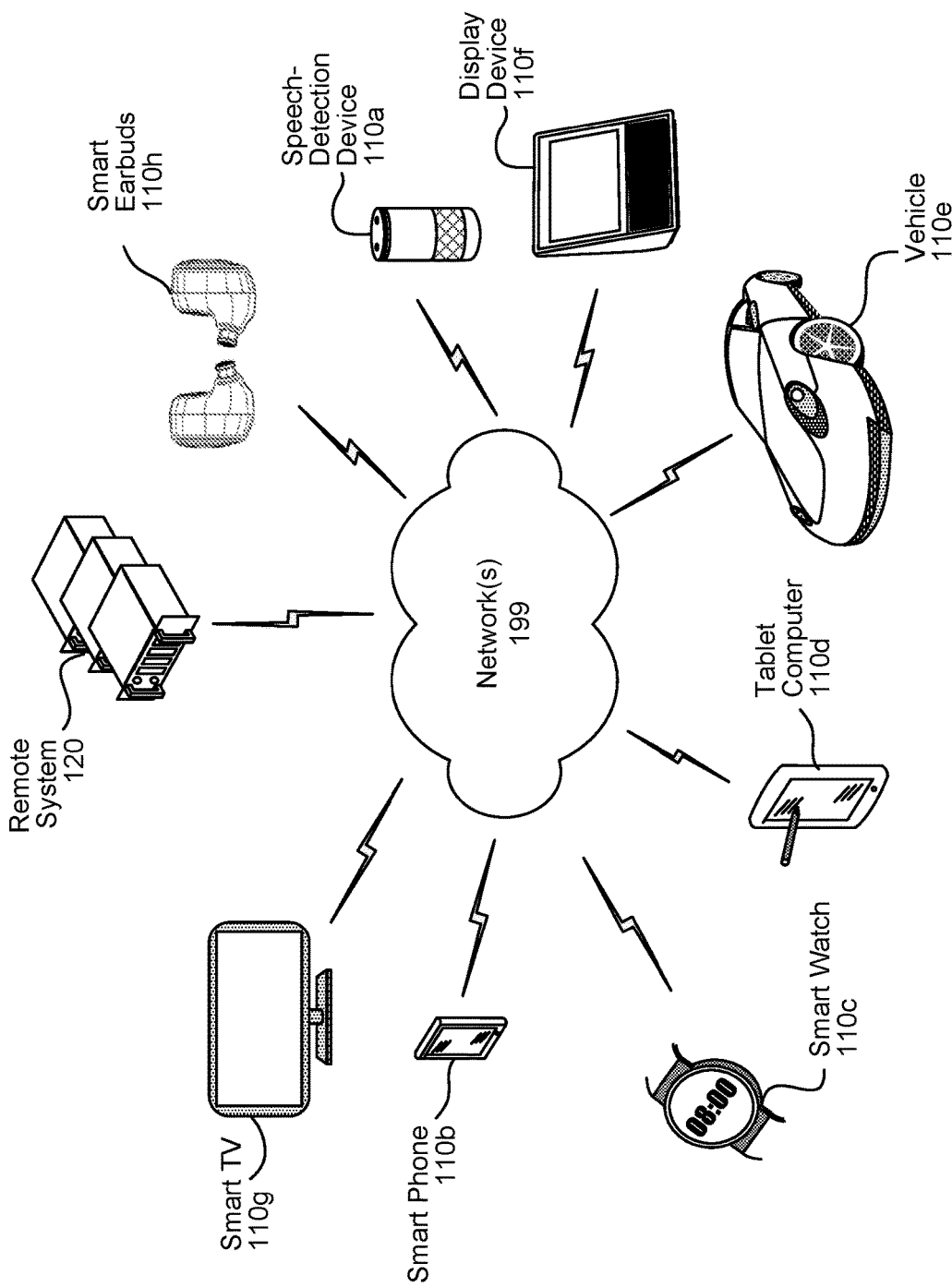
FIG. 12 illustrates an example of a computer network for use with embodiments of the present disclosure.

As illustrated in FIG. 12, multiple devices (110a-110h, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, and/or smart earbuds 110h may be connected to the network(s) 199 through a wireless service provider, over a WiFi or cellular network connection, or the like. Other devices are included as network-connected support devices, such as the remote system 120, and/or others. The support devices may connect to the network(s) 199 through a wired connection or wireless connection. Networked devices may capture audio using one-or-more built-in or connected microphones or other audio capture devices, with processing one or more remote systems 120.

The components discussed above may be operated as software, hardware, firmware, or some other combination of computing components. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting a wakeword, the method comprising:
   determining, using a user device, audio data corresponding to an utterance;
   processing, using model data corresponding to a first neural network trained using a first copy of a training neural network configured to process first data and a second copy of the training neural network configured to process second data different from the first data, the first neural network configured to distinguish between words in a vocabulary, the audio data to determine a first data vector corresponding to a point in an N-dimensional space;
   retrieving from storage a second data vector in the N-dimensional space, the second data vector corresponding to the wakeword;
   determining a difference between the first data vector and the second data vector;
   determining a distance in the N-dimensional space corresponding to the difference;
   retrieving from storage a threshold distance in the N-dimensional space, wherein the threshold distance corresponds to words that are similar to the wakeword;
   determining that the distance is less than the threshold distance;
   in response to determining that the distance is less than the threshold distance, determining that the audio data includes a representation of the wakeword; and
   in response to determining that the audio data includes the representation of the wakeword, causing speech processing to be performed on at least a portion of the audio data.

2. The method of claim 1, further comprising, prior to determining the audio data:
   processing, using the first copy of the training neural network, first training audio data representing a first training utterance to determine a third data vector in the N-dimensional space;
   processing, using the second copy of the training neural network, second training audio data representing a second training utterance to determine a fourth data vector in the N-dimensional space;
   determining that the first training utterance includes a first representation of a first word;
   determining that the first training utterance includes a second representation of the first word;
   determining a second difference between the third data vector and the fourth data vector;
   determining a second distance in the N-dimensional space corresponding to the second difference;
   determining that the second distance is less than the threshold distance; and
   causing the model data and the threshold distance to be stored by the user device.

3. A computer-implemented method comprising:
   determining, using a user device, audio data corresponding to an utterance;
   processing, using a first neural network trained using a first copy of a training neural network configured to process first data and a second copy of the training neural network configured to process second data different from the first data, the first neural network configured to distinguish between words in a vocabulary, at least a first portion of the audio data to determine a first vector representing a word of the utterance;
   determining a degree of similarity between the first vector and a second vector representing a wakeword;
   determining that the degree of similarity satisfies a condition; and
   based on determining that the degree of similarity satisfies the condition, sending, to a remote system, at least a second portion of the audio data.

4. The method of claim 3, further comprising:
   prior to determining the audio data, determining, using the user device, second audio data, a first portion of the second audio data including a representation of the wakeword; and
   processing, using the first neural network, the first portion of the second audio data to determine the second vector.

5. The method of claim 4, wherein processing the second audio data further comprises:
   processing the first portion of the second audio data to determine a third vector;
   processing a second portion of the second audio data to determine a fourth vector; and determining a mean vector from the third vector and the fourth vector.

6. The method of claim 3, further comprising:
prior to determining the audio data, determining, using the user device, second audio data corresponding to a second utterance;
sending, to a remote system, the second audio data; and
receiving, at the user device from the remote system, the second vector.

7. The method of claim 3, wherein:
determining the degree of similarity comprises determining a distance between a first point in a dimensional space corresponding to the first vector and a second point in the dimensional space corresponding to the second vector; and
determining that the degree of similarity satisfies the condition comprises determining that the distance is less than a threshold.

8. The method of claim 7, further comprising:
increasing the threshold based at least in part on determining a false-negative detection of the wakeword; or
decreasing the threshold based at least in part on determining a false-positive detection of the wakeword.

9. The method of claim 3, further comprising:
determining, using the user device, second audio data corresponding to the wakeword, wherein the audio data corresponds to a first speaker and the second audio data corresponds to a second speaker;
processing, using the first neural network, the second audio data to determine a third vector representing a second characteristic of the second audio data;
determining a second degree of similarity between the third vector and the second vector; and
determining that the degree of similarity does not satisfy the condition.

10. The method of claim 3, further comprising:
determining, using the user device, second audio data corresponding to a second utterance;
processing, using the first neural network, the second audio data to determine a third vector representing a second word; and
executing a command corresponding to the second word.

11. The method of claim 3, further comprising:
determining a third vector by processing, using the first copy of the training neural network, first training audio data representing a second word;
determining a fourth vector by processing, using the second copy of the training neural network, second training audio data representing a third word; and
determining that a distance between a first point corresponding to the third vector and a second point corresponding to the fourth vector is less than a threshold distance.

12. The method of claim 3, wherein:
the first data represents a first word or phrase spoken by a first user, and
the second data represents a second version of the first word or phrase, wherein the second version of the first word or phrase is any of the first word or phrase:
spoken by a second user,
spoken at a tempo or pitch different from the first word or phrase,
spoken with an accent, and
spoken with a different level of background noise.

13. The method of claim 3, wherein the first copy of the training neural network is further configured to process third data and the second copy of the training neural network is further configured to process the third data.

14. A system comprising:
at least one processor; and
at least one memory including instructions that, when executed by the at least one processor, cause the system to:
determine, using a user device, first audio data corresponding to a first utterance;
process, using a first neural network trained using a first copy of a training neural network configured to process first data and a second copy of the training neural network configured to process second data different from the first data, the first neural network configured to distinguish between words in a vocabulary, at least a first portion of the first audio data to determine a first vector representing a word of the first utterance;
determine, using the user device, second audio data corresponding to a second utterance;
process, using the first neural network and the first vector, at least a first portion of the second audio data to determine that the second audio data includes a representation of the word; and
based on the determination that the second audio data includes the representation, send, to a remote system, at least a second portion of the second audio data.

15. The system of claim 14, wherein the at least one memory further comprises instructions to determine that the second audio data includes the representation that, when executed, further cause the system to:
determine, using the first neural network, a second vector representing the word;
determine a degree of similarity between the first vector and the second vector; and
determine that the degree of similarity satisfies a condition.

16. The system of claim 15, wherein:
the instructions that determine the degree of similarity further comprise instructions that, when executed, further cause the system to determine a distance between a first point in a dimensional space corresponding to the first vector and a second point in the dimensional space corresponding to the second vector; and
the instructions that determine that the degree of similarity satisfies the condition further comprise instructions that, when executed, further cause the system to determine that the distance is less than a threshold.

17. The system of claim 16, wherein the at least one memory further comprises instructions that, when executed, further cause the system to:
increase the threshold based at least in part on determining a false-negative detection of the word; or
decrease the threshold based at least in part on determining a false-positive detection of the word.

18. The system of claim 15, wherein the at least one memory further comprises instructions that, when executed, further cause the system to:
determine, using the user device, third audio data corresponding to the word, wherein the second audio data corresponds to a first speaker and the third audio data corresponds to a second speaker;
process, using the first neural network, the third audio data to determine a third vector representing the word;
determine a second degree of similarity between the third vector and the second vector; and determine that the degree of similarity does not satisfy the condition.

19. The system of claim 14, wherein the at least one memory further comprises instructions to process the second audio data that, when executed, further cause the system to:
   processing the first portion of the second audio data to determine a third vector;
   processing a second portion of the second audio data to determine a fourth vector; and
   determine a mean vector from the third vector and the fourth vector.

20. The system of claim 14, wherein the at least one memory further comprises instructions that, when executed, further cause the system to:
   prior to determination of the second audio data, determine, using the user device, third audio data corresponding to a third utterance;
   send, to the remote system, the third audio data; and
   receive, at the user device from the remote system, a vector representing the word.

21. The system of claim 14, wherein the at least one memory further comprises instructions that, when executed, further cause the system to:
   determine, using the user device, third audio data corresponding to a third utterance;
   process, using the first neural network, the third audio data to determine a vector representing a second word; and
   execute a command corresponding to the second word.

22. The system of claim 14, wherein the at least one memory further comprises instructions that, when executed, further cause the system to:
   determine a second vector by processing, using the first copy of the training neural network, first training audio data representing a second word;
   determine a third vector by processing, using the second copy of the training neural network, second training audio data representing a third word; and
   determine that a distance between a first point corresponding to the second vector and a second point corresponding to the third vector is less than a threshold distance.

* * * * *